(12) United States Patent
Mellitz et al.

(10) Patent No.: US 8,018,992 B2
(45) Date of Patent: Sep. 13, 2011

(54) PERFORMING ADAPTIVE EXTERNAL EQUALIZATION

(75) Inventors: Richard Mellitz, Irmo, SC (US); Bill Samaras, Olympia, WA (US); Pete MacWilliams, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 986 days.

(21) Appl. No.: 11/981,401

(22) Filed: Oct. 31, 2007

(65) Prior Publication Data

US 2009/0110043 A1    Apr. 30, 2009

(51) Int. Cl.
*H03H 7/30* (2006.01)

(52) U.S. Cl. ........ 375/231; 375/232; 375/229; 375/226; 375/343; 375/316; 370/252; 370/465

(58) Field of Classification Search .................. 375/232, 375/231, 230, 229, 346, 316, 226, 343; 370/252, 370/465

See application file for complete search history.

(56) References Cited

U.S. PATENT DOCUMENTS

| | | | |
|---|---|---|---|
| 6,009,488 A | 12/1999 | Kavipurapu | 710/105 |
| 6,124,997 A * | 9/2000 | Hirasaka | 360/65 |
| 7,583,608 B2 * | 9/2009 | Chimitt | 370/252 |
| 7,764,731 B2 * | 7/2010 | Uchiki et al. | 375/229 |
| 2001/0031020 A1 * | 10/2001 | Hwang et al. | 375/316 |
| 2004/0047409 A1 * | 3/2004 | Lee et al. | 375/232 |
| 2005/0047495 A1 * | 3/2005 | Yoshioka | 375/219 |
| 2007/0071083 A1 | 3/2007 | Canagasaby et al. | 375/229 |
| 2007/0157015 A1 * | 7/2007 | Swanson et al. | 713/2 |

OTHER PUBLICATIONS

Casper et al.; An 8-Gb/s Simultaneous Bidirectional Link With On-Die Waveform Capture; Dec. 2003; IEEE, vol. 38; p. 2111-2120.*
U.S. Appl. No. 11/646,851, filed Dec. 27, 2006, entitled "Common Mode Adaptive Equalization," by Richard Mellitz.

* cited by examiner

*Primary Examiner* — Eva Puente
(74) *Attorney, Agent, or Firm* — Trop, Pruner & Hu, P.C.

(57) ABSTRACT

In one embodiment, the present invention includes a method communicating control information for an external adaptive equalization process for a channel coupled between a transmitter and a receiver from an external agent. In this way, the external agent may control tap settings of an equalizer based on feedback information from the receiver responsive to a data pattern generated and transmitted by the transmitter. Other embodiments are described and claimed.

16 Claims, 4 Drawing Sheets

PERFORMING ADAPTIVE EXTERNAL EQUALIZATION

BACKGROUND

Various communication interfaces rely on a priori settings of transmitter equalizer taps. These tap settings are either set from a pre-calculated design guide table or from tedious detailed bit error rate (BER) simulation analysis. Currently, one tap setting applies for all copies of a particular product implementation. This single tap setting is derived as a worst case assembly of electrical, physical, and silicon variables that affect channel performance and BER. As the tap setting is worst case, a particular system instantiation (copy) may be capable of higher performance since the worst case channel may not be realized.

Other systems provide a mechanism for adaptive communication equalization. Such equalization typically occurs within a receiver chip or within a transmitter communicating with the receiver invoking a back channel protocol, which can be a power consuming and complex process, and which can further increase chip real estate consumption.

DETAILED DESCRIPTION

In various embodiments, four components may be used together to enable an external adaptive equalizer (exoequalizer) for use with a communication channel coupled between a transmitter and a receiver. The first is an interconnect built-in self test (IBIST) unit that may be present in at least one of the transmitter and receiver. The second is an on-die scope (ODS) that can monitor eye width of an incoming data pattern in the receiver. The third is one or more registers that control equalizer settings. The fourth is the control of the previous three with external communications such as in-circuit test probe (ITP), Basic Input/Output System (BIOS), or application code.

Embodiments thus provide an equalization apparatus in which channel equalization taps are iteratively intelligently set and evaluated using an external control process such as ITP or BIOS, which measures eye quality cost metrics from the ODS responsive to a data pattern generated by an IBIST. All other control operations, such as dynamically optimizing the tap settings, occur external to the semiconductor devices in BIOS or application code. Hardware access to device control functions may occur through the ITP, in one embodiment. Driver or receiver equalizer (tap) settings can thus be optimized for maximum channel performance using the external control process. Taps which are intelligently seeded from a design guide or simulation analysis can reduce the total time required for the exoequalization process to execute, in some embodiments.

Embodiments may be used to increase the interconnect solution space (physical length) and/or increase operating frequency. In this way, the need to impose expensive or cumbersome channel quality features in system designs (e.g., fiberweave panel shift, back drilled vias, expensive connectors) can be alleviated. As tap settings are cumbersome to predict and design a priori for a reference design, embodiments may eliminate tap setting and fine channel optimization from the system design process. Instead, automatic tap settings allow each system implementation to be an optimization of its physical components.

Figure 1:
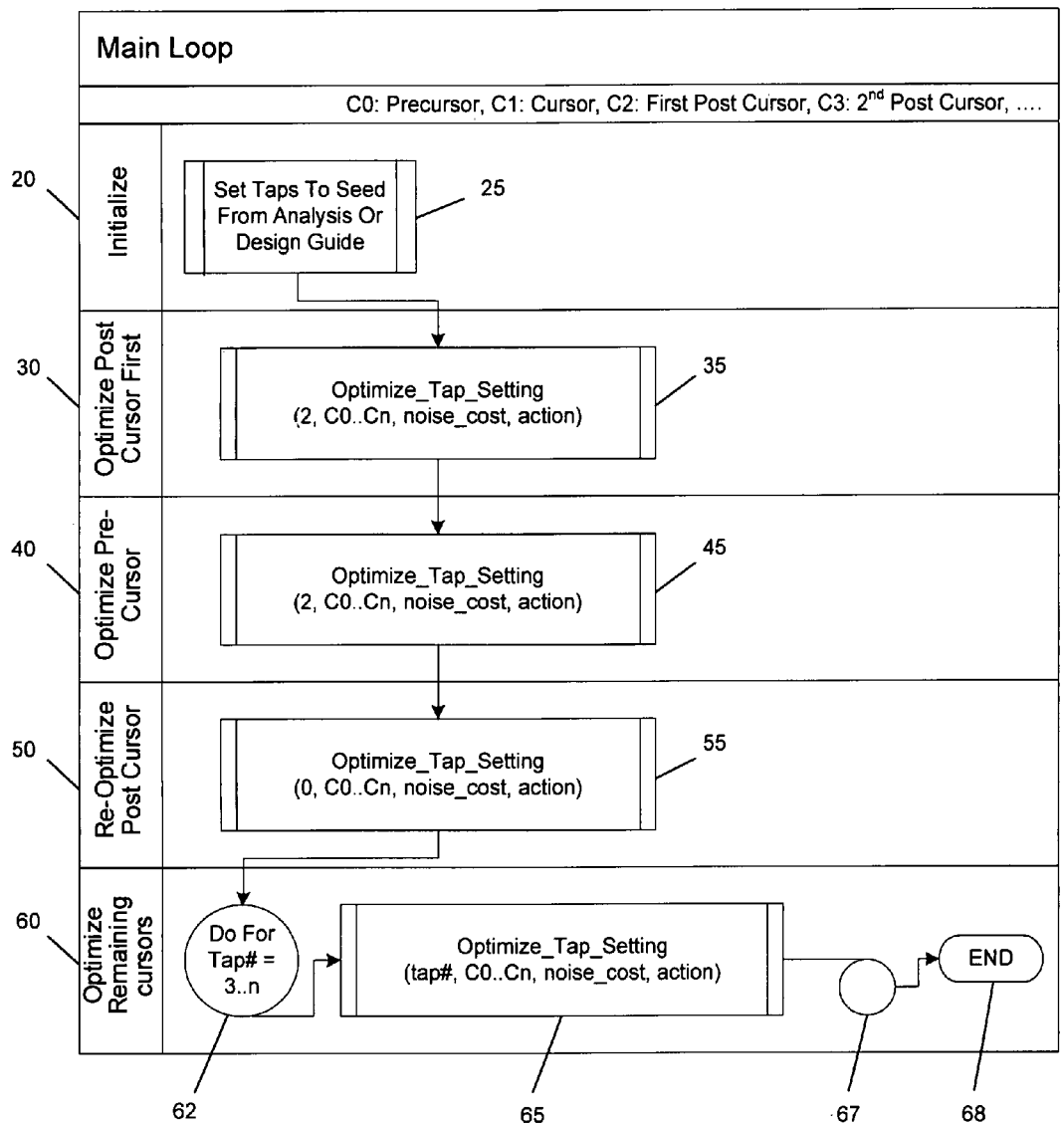
FIG. 1 is a flow diagram of a method in accordance with one embodiment of the present invention.

Referring to FIG. 1, shown is a flow diagram of a method in accordance with one embodiment of the present invention. As shown in FIG. 1, method 10 may be used to sequentially optimize all taps associated with a communication channel. For example, the taps may be present in a transmitter that is to transmit data across a communication channel to a receiver. While the scope of the present invention is not limited in this regard, an equalizer may include one or more delay stages formed of a filter, which in some embodiments may be a time-varying finite impulse response (FIR) filter, having an input that varies depending upon the instantaneous state of data to be transmitted. The filter may include a number of delay elements and tap coefficients. These delay elements may be used to generate pre-cursors, cursor and post-cursors. Different numbers of tap coefficients may be present depending upon desired frequencies of operation, length of interconnect, or other physical features of a specific system implementation (e.g., board layout) and its interconnects. In various embodiments, the receiver and transmitter may be separate semiconductor devices adapted on a circuit board, such that the communication channel may include one or more conductive traces coupled between the devices.

Referring to FIG. 1, method 10 may begin by performing an initialization process 20. In the initialization process, a setting process 25 may be performed in which the various taps are set to seed values. While the scope of the present invention is not limited in this regard, these seed values may be obtained from a previously performed analysis or a design guide, such as standardized tap values for a reference system.

Then a post cursor may be first optimized (block 30). More specifically, a tap optimization setting routine 35 may be performed for the post cursor. As will be described further below, various steps may be performed in optimizing this tap setting. Referring still to FIG. 1, next a pre-cursor may be optimized (block 40). Specifically, a similar tap setting optimization 45 may be performed for the pre-cursor.

Still referring to FIG. 1, next at block 50 the post cursor may be re-optimized. More specifically, based on the previously optimized post cursor settings and pre-cursor settings, the post cursor settings may be re-optimized to new tap settings (block 55). Finally, at block 60, any remaining cursors may be optimized. More specifically, a do-while loop 62-67 including an optimization 65 of tap settings for tap numbers 3-n may be performed in the do-while loop until all optimized tap values are realized and method 10 concludes (at 68). Thus using embodiments of the present invention, dynamic external equalization may be realized for a specific communication channel that is used to enable communication between a transmitter and receiver tuned to the specific communication channel, rather than a fixed equalization according to a static design-based equalization. Embodiments increase performance by automatically tuning taps to create an optimum channel for a particular product (e.g., circuit board).

Figure 2:
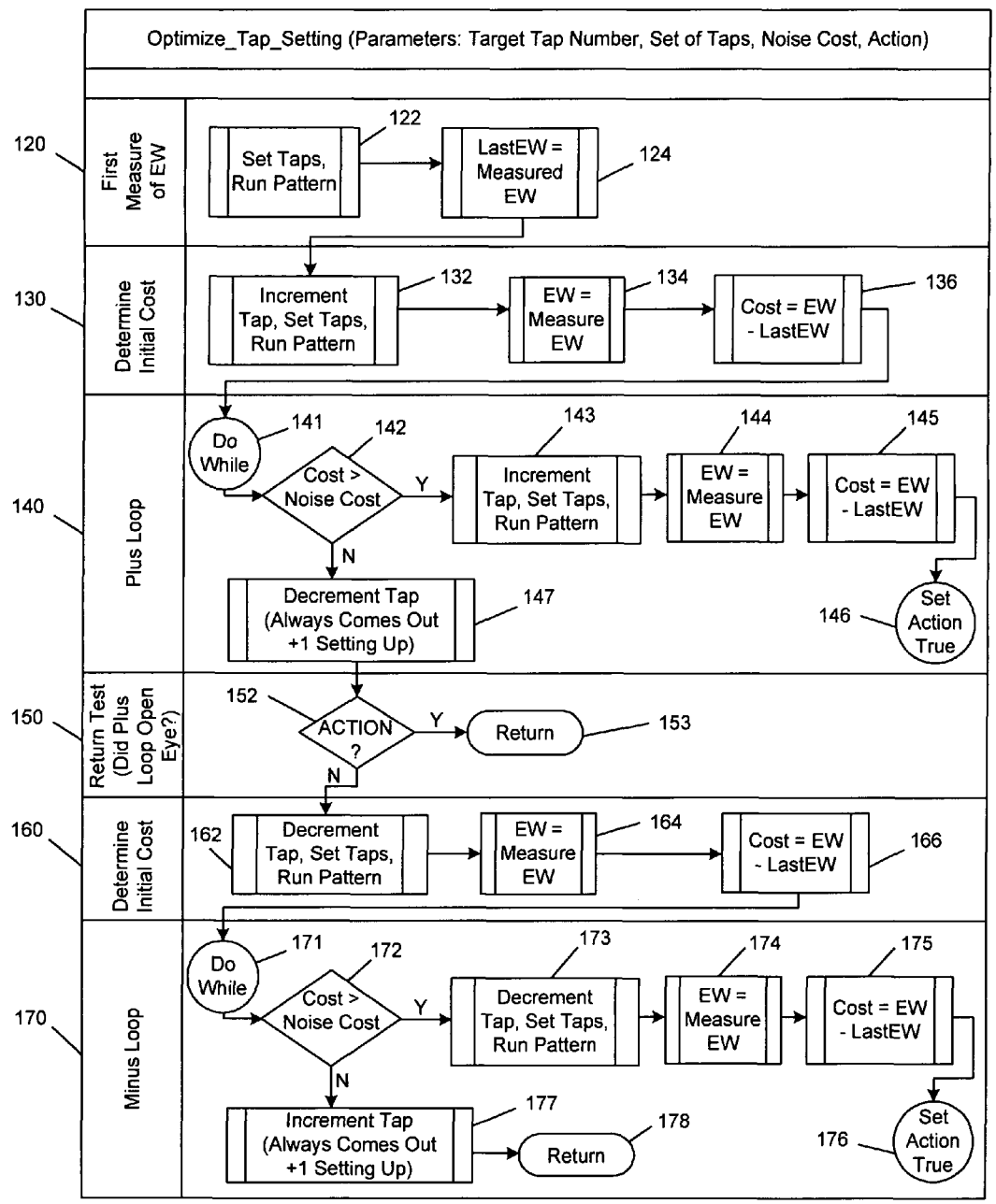
FIG. 2 is a flow diagram of a tap optimization process in accordance with one embodiment of the present invention.

While the tap optimization processes performed in blocks 35, 45, 55 and 65 may be implemented in various manners in different embodiments, referring now to FIG. 2, shown is a flow diagram of a tap optimization process in accordance with one embodiment of the present invention. As shown in FIG. 2, process 100 may be used to optimize tap settings for a single tap. The parameters for the tap optimization process may include a target tap number, a set of taps, noise costs and action. Note that action may correspond to the result as to whether adjusting a tap setting results in opening of an eye pattern (i.e., increasing the eye width) measured in the receiver.

As shown in FIG. 2, system 100 may begin by generating a first measure of eye width (EW) (block 120). Alternatively, other measures of eye opening quality may be used such as any eye quality metric that affects BER. To determine the eye width corresponding to received signals at the receiver, the taps may be set and a predetermined data pattern run, which may be generated by an IBIST of the transmitter (block 122). Then a measurement of eye width may be made such that a value of a variable LastEW equals the measured eye width (block 124). Control then passes to block 130, where an initial cost may be determined. This cost may correspond to a difference between the measured eye width and the LastEW. Specifically, at block 132 the tap is incremented, all other taps are set, and the predetermined pattern is run again and an updated measure of eye width is made at block 134. Then the cost is determined at block 136 as the difference between the measured eye width and the last EW.

Control then passes to a plus loop 140. Plus loop 140 may be realized as a do-while loop 141-146 in which a determination is made as to whether the calculated cost is greater than a noise cost (block 142). The noise cost may correspond to a predetermined acceptable level of noise for the communication channel. If it is determined that the cost is greater than the noise cost, control passes to block 143 where the tap is incremented, the other taps are set and the predetermined pattern is run. The eye width is again measured at block 144 and an updated cost determined at block 145. At step 146, the action is set to true and control passes back to 141 for a next determination of whether the cost is greater than the noise cost at diamond 142. If not, the tap may be decremented at block 147.

As shown in FIG. 2, control passes from block 140 to block 150 for a test return. Specifically, at diamond 152 it is determined whether the resulting tap setting opens the eye width, i.e., the measured eye quality is better than the initial eye quality. If so, method 100 is concluded and control returns at block 152, e.g., to another tap setting such as set forth in FIG. 1. If instead at diamond 152 it is determined that the eye width is not opened by the current tap setting, control passes to block 160 where a new initial cost may be determined. Specifically, at block 162 the tap is decremented, all taps are set and the predetermined data pattern is run. Then the eye width is again measured at block 164 and a cost is determined at block 166 which corresponds to a difference between the current eye width and the previous eye width (LastEW). Control then passes to block 170, which is a minus loop in which the tap setting is decremented. More specifically, a do-while loop 171-176 is performed for so long as the cost is greater than a noise cost, which is determined in diamond 172. If so, control passes to block 173 where the tap is decremented, all taps are set and the pattern is run. Then the eye width is again measured at block 174 and a cost is determined at block 175 which corresponds to the difference between the current eye width and the previous eye width. At step 176, the action is set to true and control passes back to 171 for a next determination of whether the cost is greater than the noise cost at diamond 172. If the cost is determined to be less than the noise cost, control passes to block 177, where the tap is incremented and method 100 concludes at 178. While described with this particular implementation the embodiments of FIGS. 1 and 2, the scope of the present invention is not limited in this regard.

Figure 3:
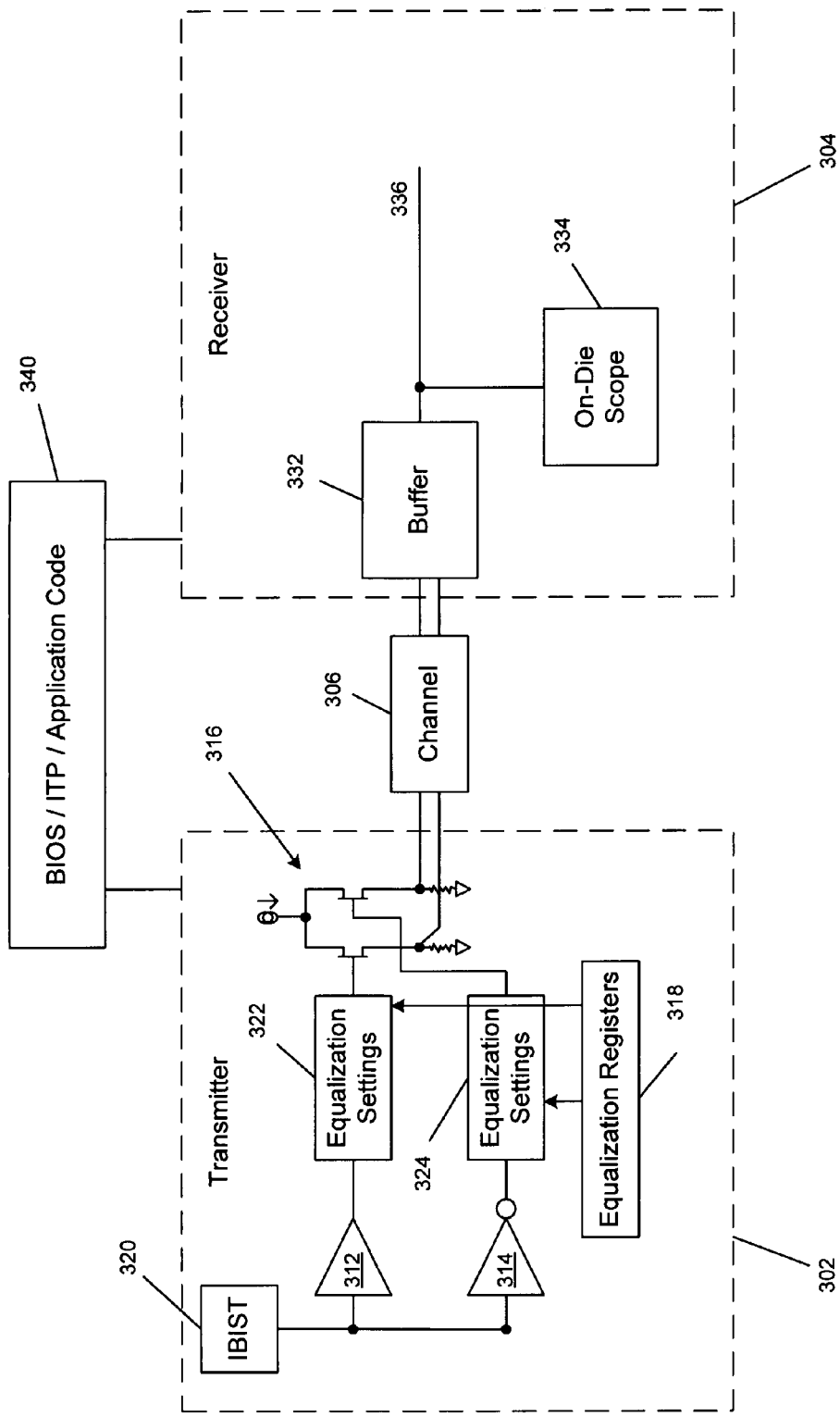
FIG. 3 is an illustration of a portion of a system in accordance with one embodiment of the present invention.

FIG. 3 illustrates a portion of a system 300 according to some embodiments. In some embodiments, system 300 includes a transmitter 302, a receiver 304, and a transmission channel 306. In some embodiments transmitter 302 is a differential signal transmitter, receiver 304 is a differential signal receiver, and transmission channel 306 is a serial differential transmission channel. While not limited in this regard, in one embodiment transmitter 302 may be a first system agent such as a processor, chipset and graphics or other processing unit, and receiver 304 may be another such system agent such as another processor, memory, input/output (I/O) agent or other such processing device. As shown in FIG. 3, a differential signal is injected into the transmission channel 306 from the transmitter 302.

In some embodiments transmitter 302 includes pre-drivers 312 and 314 (for example differential signal drivers), a current mode differential driver circuit 316, equalizer registers 318, and positive and negative equalizers 322, 324, each of which may include multiple cursors having taps set in accordance with an embodiment of the present invention. In some embodiments current mode differential driver circuit 316 includes two transistors, two resistors, and a current source in the circuit arrangement as illustrated in FIG. 3. Transmitter 302 may further include an IBIST 320, which may provide predetermined data patterns to pre-drivers 312 and 314 during external adaptive equalization in accordance with an embodiment of the present invention. However, other circuits may be used in some embodiments.

In some embodiments, receiver 304 includes a buffer to receive and condition the incoming signals. The output 336 of buffer 332 may be provided to other circuitry of receiver 304 (not shown in FIG. 3) for further processing. Furthermore, during adaptive external equalization process, this output signal may also be provided to an on-die scope 334 for measurement of an eye width of the incoming data pattern.

Referring still to FIG. 3, both transmitter 302 and receiver 304 may be coupled to communicate with an external communication source 340 which may be, in some embodiments, BIOS, an ITP, and/or application code, or combinations thereof. That is, external communication source 340 may be adapted as hardware, software, firmware or combinations thereof to enable control of IBIST 320, equalization registers 318, and on-die scope 334 during external adaptive equalization. While shown with these limited components for ease of illustration in the embodiment of FIG. 3, understand that equalization may occur in both transmitter and receiver, and the equalization components may also be present in receiver 302, while similarly the on-die scope may also be present within transmitter 302.

Figure 4:
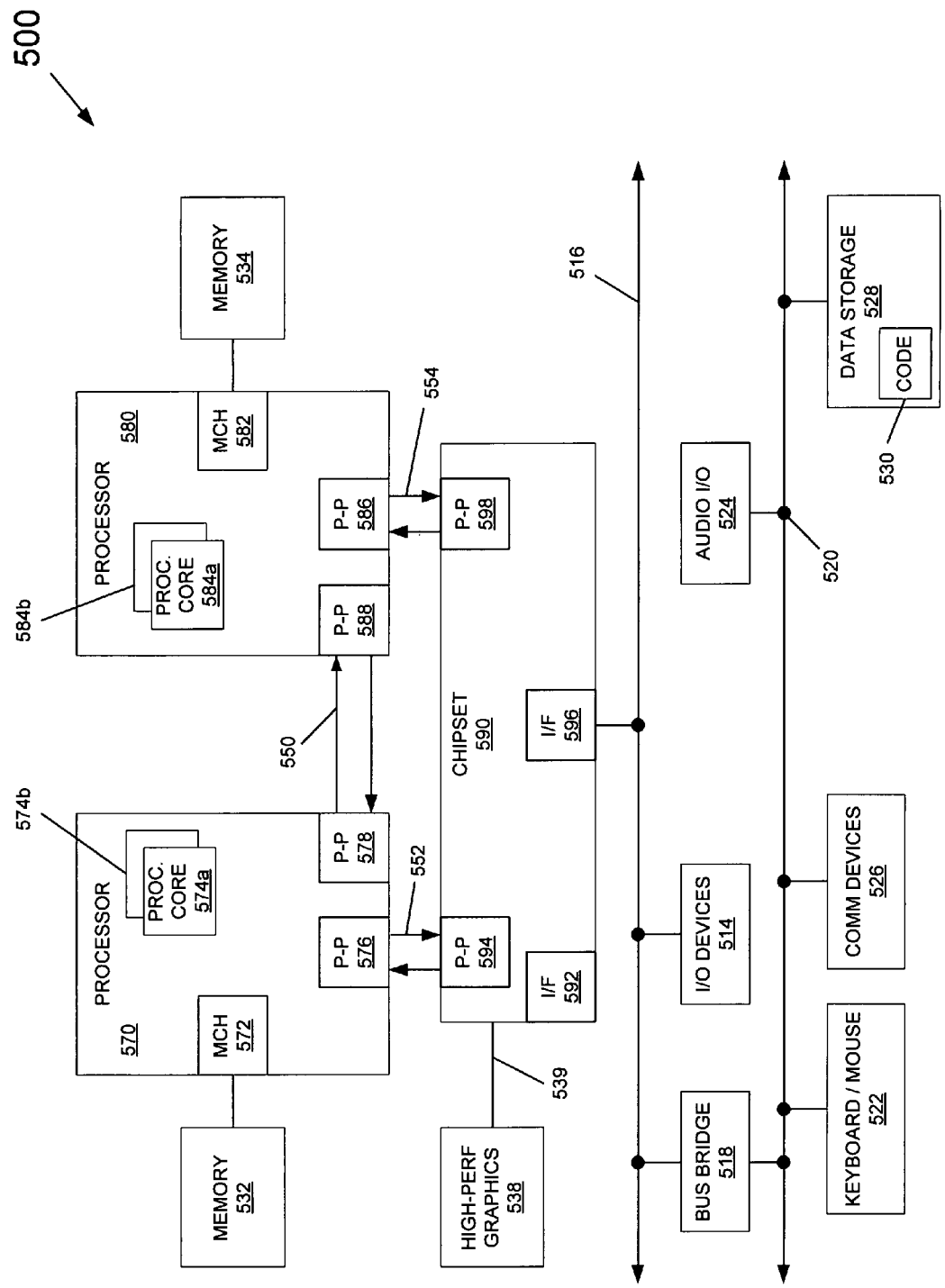
FIG. 4 is a block diagram of a system in accordance with an embodiment of the present invention.

Embodiments may be implemented in many different system types. Referring now to FIG. 4, shown is a block diagram of a system in accordance with an embodiment of the present invention. As shown in FIG. 4, multiprocessor system 500 is a point-to-point interconnect system, and includes a first processor 570 and a second processor 580 coupled via a point-to-point interconnect 550. As shown in FIG. 4, each of processors 570 and 580 may be multicore processors, including first and second processor cores (i.e., processor cores 574a and 574b and processor cores 584a and 584b).

Still referring to FIG. 4, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 4, MCH's 572 and 582 couple the processors to respective memories, namely a memory 532 and a memory 534, which may be portions of main memory (e.g., a dynamic random access memory (DRAM)) locally attached to the respective processors. First processor 570 and second processor 580 may be coupled to a chipset 590 via P-P interconnects 552 and 554, respectively. As one example, each of processors 570 and 580 may include an IBIST, an equalizer and control registers, and an ODS to enable external adaptive equalization under control of BIOS, an ITP, and/or application code, e.g., stored in memory 532 or 534.

As shown in FIG. 4, chipset 590 includes P-P interfaces 594 and 598. Furthermore, chipset 590 includes an interface 592 to couple chipset 590 with a high performance graphics engine 538. In turn, chipset 590 may be coupled to a first bus 516 via an interface 596. As shown in FIG. 4, various I/O devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    communicating control information for an adaptive equalization process for a channel coupled between a transmitter and a receiver from an agent external to the transmitter and the receiver, the agent including application code and an in-circuit test probe;
    controlling tap settings of an equalizer of at least one of the transmitter and the receiver responsive to the control information;
    generating a data pattern using a built-in self test unit of the transmitter and transmitting the data pattern from the transmitter to the receiver along the channel; and
    measuring an initial eye quality of the data pattern in the receiver using an on-die scope of the receiver and adjusting the tap settings, the built-in self test unit, the on-die scope, and the tap settings adjusting controlled by the agent, wherein the agent is to determine an initial cost based on a difference between an updated eye quality measured after adjusting the tap settings and the initial eye quality, and increment the tap settings if the initial cost is greater than a predetermined noise cost.

2. The method of claim 1, wherein communicating the control information includes providing initial register settings for a plurality of equalization registers associated with the equalizer.

3. The method of claim 1, further comprising measuring the eye quality of the data pattern transmitted using the decremented tap settings, and determining if the measured eye quality is better than the initial eye quality.

4. The method of claim 1, further comprising controlling the tap settings for a plurality of cursors of the equalizer.

5. The method of claim 4, wherein controlling the tap settings for the plurality of cursors includes first adjusting tap settings for a post cursor, second adjusting tap settings for a pre-cursor, and re-adjusting the tap settings for the post cursor.

6. A system comprising:
    a transmitter including an equalizer controlled by settings in an equalization storage including tap settings for the equalizer, the transmitter further including a self test unit to generate a data pattern for transmission to a receiver coupled to the transmitter by an interconnect; and
    an external agent to communicate control information to the transmitter and the receiver for a dynamic external adaptive equalization process, wherein the control information includes initial tap settings for storage in the equalization storage, wherein the external agent is to receive an eye quality measure from an on-die scope of the receiver responsive to receipt of the data pattern in the receiver and to update the tap settings based on the eye quality measure, wherein the external agent is to determine an initial cost based on a difference between an updated eye quality measured after adjusting the tap settings and the eye quality measure, and increment the tap settings if the initial cost is greater than a predetermined noise cost.

7. The system of claim 6, wherein the external agent comprises an in-circuit test probe.

8. The system of claim 6, wherein the external agent is to otherwise decrement the tap settings, and measure the eye quality of the data pattern transmitted using the decremented tap settings, and determine if the measured eye quality is better than the eye quality measure.

9. The system of claim 7, wherein the transmitter comprises a first semiconductor device of the system, the receiver comprises a second semiconductor device of the system, and the interconnect comprises a board trace of a circuit board including the first and second semiconductor devices.

10. The system of claim 6, wherein the external agent is to control the tap settings for a plurality of cursors of the equalizer.

11. The system of claim 10, wherein the external agent is to first adjust tap settings for a post cursor, second adjust tap settings for a pre-cursor, and third re-adjust the tap settings for the post cursor.

12. The system of claim 6, wherein the initial tap settings are seeded from a design guide.

13. A system comprising:
    a transmitter including an equalizer controlled by settings in an equalization storage including tap settings for the equalizer;
    a receiver coupled to the transmitter by an interconnect and including an on-die scope;
    an in-circuit probe coupled to the transmitter and the receiver to communicate control information to the transmitter and the receiver for external adaptive equalization, wherein the in-circuit test probe is to receive an eye quality measure from the on-die scope during the external adaptive equalization and to communicate updated tap settings based on the eye quality measure; and an application to receive the eye quality measure from the in-circuit test probe and to determine an initial cost based on a difference between an updated eye quality measured after updating the tap settings and the eye quality measure, and increment the tap settings if the initial cost is greater than a predetermined noise cost.

14. The system of claim 13, wherein the application is to otherwise decrement the tap settings, and measure the eye quality of a data pattern transmitted using the decremented tap settings, and determine if the measured eye quality is better than the eye quality measure.

15. The system of claim 13, wherein the in-circuit test probe is to communicate the tap settings for a plurality of cursors of the equalizer.

16. The system of claim 15, wherein the in-circuit test probe is to first adjust tap settings for a post cursor, second adjust tap settings for a pre-cursor, and third re-adjust the tap settings for the post cursor.

* * * * *